United States Patent

Pirim

[11] Patent Number: 5,245,631
[45] Date of Patent: Sep. 14, 1993

[54] PROCESS AND DEVICE FOR TRANSMITTING NUMERICAL DATA

[75] Inventor: Patrick Pirim, Montigny Le Bretoneux, France

[73] Assignees: Renaud Marchand, Core Belle; Michel Bonnaval-Lamothe, Cote-Belle; Societe de Recherche Development Et En Application Matiere Brevetable (S.R.D.A.M.B.), Courhevoie, all of France

[21] Appl. No.: 640,383

[22] PCT Filed: Nov. 23, 1988

[86] PCT No.: PCT/FR88/00571
 § 371 Date: Jan. 18, 1991
 § 102(e) Date: Jan. 18, 1991

[87] PCT Pub. No.: WO90/06030
 PCT Pub. Date: May 31, 1990

[51] Int. Cl.$^5$ .............................. H04L 27/10
[52] U.S. Cl. .............................. 375/48; 375/89
[58] Field of Search ............ 375/48, 89; 341/177, 341/144, 145; 340/825.75; 382/50

[56] References Cited

U.S. PATENT DOCUMENTS

| | | | |
|---|---|---|---|
| 3,566,033 | 2/1971 | Young | 178/66 |
| 3,668,562 | 6/1972 | Fritkin | 332/9 |
| 4,066,841 | 1/1978 | Young | 178/66 |
| 4,306,308 | 12/1981 | Hossen | 375/48 |
| 4,809,299 | 2/1989 | Ho | 375/89 |
| 4,972,435 | 11/1990 | Ho | 375/48 |

FOREIGN PATENT DOCUMENTS 2615678 11/1988 France .

*Primary Examiner*—Curtis Kuntz
*Assistant Examiner*—T. Ghebretinsae
*Attorney, Agent, or Firm*—Roylance, Abrams, Berdo & Goodman

[57] ABSTRACT

A process and a device transmits numerical data in the form of a sequence of words. The process includes an encoding phase, a transmission stage and a decoding phase. In the encoding phase, the data creates an analog signal whose period is composed of several fractions of the period, each one depending on a word of the data. The analog signal is transmitted. In the decoding phase, the signal is divided into p fractions corresponding to the encoding fractions, and the fractions are analyzed to deduce the sequence of words. The process permits a high flow of transmission for a particular transmission band width.

30 Claims, 6 Drawing Sheets

PROCESS AND DEVICE FOR TRANSMITTING NUMERICAL DATA

FIELD OF THE INVENTION

The invention concerns a process and a device for transmitting numerical data in the form of a sequence of words. For a given band of transmission frequencies, the invention permits a high flow of transmission.

In particular, it is applicable for transmitting numerical data representing an image in which each word represents a spectral characteristic (luminance, chrominance . . . ) of one point of the image.

BACKGROUND OF THE INVENTION

There currently exists a known system for transmitting numerical data appearing in the form of a sequence of words in which the words are successively converted into a variable frequency analog signal whose frequency represents the value of those words. Each period of the signal possesses a period proportional to the value of one word of the sequence to be transmitted. This analog signal is transmitted by any device, in particular by a telephone connection and is then decoded on the receiving location with the aid of a phase locking loop delivering a voltage proportional to the input frequency; this voltage is then converted into a numerical signal so as to restore the original numerical data.

The main defect of this type of system is that each word requires at least one period of the analog signal so as to represent its value. This limitation, which firstly results from the actual principle of the process and secondly the nature of the decoding means used (automatic control of the phase locking loop requiring at least one period), entails for a given frequency band a transmission flow (in words per second) limited to the value of the frequency. In addition, in such a system, it is necessary to introduce between words or groups of words synchronism pulses making it possible to recognize the relative positions of the data according to the decoding principle with the aid of a phase locking loop which generates an uncertainty in the position of the words. In addition, the phase locking loops are used in these systems up to the limit of their possibilities and are extremely delicate to adjust from the industrial point of view.

SUMMARY OF THE INVENTION

The present invention seeks to mitigate the defects of the above-mentioned known system.

The main purpose of the invention is to provide the new transmission process in which the coding and decoding of the numerical data permits a high transmission flow for a determined band of frequencies, this flow possibly being much higher than that of the known system for a similar accuracy of transmission.

Another object is to provide a decoding of the data in which the words are correctly positioned in the absence of any additional synchronization signal.

Another object is to provide a transmission device not involving any industrial adjustment difficulty.

Another object is to provide a device whose functions are able to be wired in a "VLSI" ("Very large scale integration") type integrated circuit.

Another object is to provide a device whose cost, volume and energy consumption are reduced.

To this effect, the process of the invention for transmitting numerical data (M) appearing in the form of a sequence of words (M1, M2, M3 . . . ) possesses a coding phase in which the data is converted into a periodic analog signal, a transmission stage consisting of transmitting said analog signal, and a decoding phase in which the signal received is converted into a numerical signal representing the data (M).

In the coding phase, the analog signal is drawn up from the numerical data by generating from said data and from a reference frequency (F) a numerical signal (Nv), the frequency of which is dependent upon said data in a time base linked to the reference frequency (F). Each period of said numerical signal is composed of p period fractions (p>1). Each function of one word (M1, M2 . . . ) of the data is encoded by carrying out on said numerical signal (Nv) a periodic transfer function with a predetermined form, especially sinusoidal, so as to generate a transcoded numerical signal (Nt) representative of the preceding signal (Nv) and having a periodic distribution linked to said transfer function, and by carrying out a digital to analog conversion of said transcoded signal (Nt).

In the decoding phase, the numerical signal representing the data is drawn up from the transmitted analog signal, by converting this analog signal into a numerical signal (Ne) by a sampling at a second reference frequency (F') linked to the first reference frequency (F), and by drawing up from this numerical signal (Ne) and the transfer function. Working thresholds delimiting in said numerical signal p period fractions corresponding to those of the coding. By analysing the numerical signal (Ne) between said working thresholds in a time base corresponding to the reference frequency (F'), a numerical signal (Nd) representing is generated the durations between working thresholds. By calculating from this numerical signal (Nd) the sequence of words (M1, M2 . . . ) of the data is formed.

In particular, the process of the invention includes:
a) in the coding phase,
  generating a first electric time reference signal (H1) including high frequency reference pulses (F),
  loading successively a parameter (A+M) depending upon of each word (M1, M2 . . . ) into a storage register when ordered by a loading signal (Ch) composed of a sequence of loading pulses,
  dividing the reference signal (H1) by the parameter (A+M) contained in the storage register so as to deliver a temporal data signal (Td) having a frequency ($F/_{A+M}$) varying discretely as an inverse function of the sequence of words ($F/_{A+M1}$, $F/_{A+M2}$ . . . ),
  carrying out a modulo n counting of the temporal data signal (Td) so as to deliver a numerical signal (Nv) constituted by the counting values, n being a whole number selected according to the accurateness of the desired transmission,
  carrying out a linear combination of said numerical signal (Nv) so as to validate this signal step-by-step with the aid of incrementation steps in a sufficient number equal to p (p≦n) with durations d1, d2 . . ., di . . . dp, with a view to generating said loading signal (Ch) including a loading pulse at the end of each step,
  carrying out a periodic transfer function at the frequency $$\frac{F}{n \cdot (A + M)}$$

on the numerical signal (Nv) so as to deliver a transcoded numerical signal (Nt) representative of the levels of the transfer function for the values of the numerical signal (Nv), converting the transcoded numerical signal (Nt) into an analog signal (Sa) with maximum calibrated amplitude so as to deliver a periodic analog signal having for an envelope said transfer function, each period of this analog signal being composed of p period fractions, each depending upon one word (M1, M2 . . . ), b) transmitting this analog signal (Sa) and receiving it suitably adapted (S"a), c) in the decoding phase:

generating a second electric time reference signal (H2) with a frequency (F') linked to the frequency (F) of the first reference signal (H1) in a constant ratio $\lambda = F/F'$, converting the adapted analog signal (S"a), with a sampling frequency F', into a numerical signal (Ne), namely an image of the transcoded numerical signal (Nt), extracting and storing the minimum and maximum delimiters (MIN, MAX) of said numerical signal (Ne) with a view to generating amplitude data (DA) characterizing the signal (Ne), storing for each of the aforesaid p incrementation steps, on the one hand, at least two thresholds of the periodic transfer function for a standardized amplitude of the latter, on the other hand, the temporal deviations between said thresholds with respect to the period of the transfer function, said thresholds being denoted as "standardized thresholds" and said deviations as "standardized deviations", carrying out a restoring to scale of said standardized thresholds according to the amplitude data (DA) so as to obtain threshold values shifted according to said amplitude data and denoted as working thresholds, comparing the numerical signal (Ne) with the working thresholds with a view to generating a numerical signal (Na) validated during the durations between working thresholds, counting the number of reference pulses of the second reference signal (H2) in the presence of the validated numerical signal (Na) so as to generate a numerical signal (Nd) with several counting values representative of the periods during which the validated numerical signal (Na) is present, dividing each value of the aforesaid numerical signal (Nd) by the corresponding standardized deviation with a view to generating a sequence of values (Vs), each referring to the period of the periodic transfer function, for each incrementation step, working out, if appropriate, the average of said values (Vs) with a view to generating a numerical signal (Nm) with p mean values (Vm) as a function of the sequence of words (M1, M2 . . . ), in the case where F' differs from F, multiplying each of said p mean values by the coefficient $\lambda$ with a view to obtaining a set of p corrected values (Vc), dividing each aforesaid corrected value (Vc) by a parameter depending upon the modulo n with a view to obtaining a set of results (A+M1, A+M2 . . . ) and deducing from this the sequence of words (M1, M2. . . ) constituting the numerical data.

Thus, in the process of the invention, each word is represented by one incrementation step which corresponds to one fraction of the period of the signal transmitted. In particular, the periodic transfer function selected may be a sinusoidal function whose period is divided into four incrementation steps of the same duration so that the transmitted analog signal (Sa), having a sinusoidal course, bears four words per period. The loading signal (Ch) is then generated by a linear combination of the numerical signal (Nv) by validating this signal on these four incrementation steps. Each step corresponds to one quarter of the period of the transfer function and thus to one quarter of the period of the analog signal with the result that the number of words transmitted in this example is equal to 4 times the frequency of the transmission band, namely a multiplying factor equal to 4 with respect to the earlier system.

As shall be seen subsequently, this division of the period into 4 steps offers advantages allowing for good accuracy of reproduction (owing to the large number of samples in each step) and easy decoding (as this division corresponds to extremely simple binary calculations). However, the process of the invention makes it possible to select a considerably higher number of different incrementation steps, such as eight (two steps per quarter period) with less accuracy but with a larger transmission rate.

Furthermore, in the process of the invention, decoding is affected by a numerical automatic control which eliminates all the drawbacks of phase locking loops. In addition, at the time of decoding, the numerical signal (Nd) is generated by counting the second temporal reference signal (H2) between working thresholds so that the values obtained representative of the durations between thresholds are discorrelated from the noise affecting the transmitted analog signal.

In the preferred case of a sinusoidal transfer function, the counting values constituting the numerical signal (Nv) are transformed into sinusoid levels distributed over each incrementation step and in particular over each quarter of a period so as to furnish the transcoded numerical signal (Nt). The number -n- of the sinusoid levels for each period (number defined by the modulo n counting) conditions the accuracy of the analog signal (Sa) which is transmitted. In practice, a binary counting, modulo $n = 2^b$ of the temporal signal (Td) is effected with $b \geq 6$ and in particular equal to 7 or 8 so as to have good accuracy and a technically embodiable frequency of the time reference signal (H1). The numerical signal (Nv) derived from said counting is then a binary signal with b bits of increasing weight.

In the coding phase, the sinusoidal transfer function may be carried out by any known device and in particular by calculation. However, a prior storing of this function in a table form makes it possible to use a simpler and faster device. This table contains the data representative of the values, modulo n, of the transfer function at predetermined addresses. The transfer function is then embodied by successively addressing said table with the aid of the binary counting values of the numerical signal (Nv) and by simultaneously extracting the corresponding data contained in the table.

Furthermore, the transmitted analog signal is advantageously adapted for receiving by firstly adding to it a continuous component so that the resultant signal, the so-called shifted analog signal (S'a), still retains the same sign, and secondly by amplifying said shifted analog signal with a variable gain adjusted sequentially so as to deliver an amplified analog signal (S"a) extending over a predetermined maximum amplitude.

In the decoding phase, conversion is then effected on the amplified analog signal (S"a) by an analog/digital converter having a range of conversion equal to said maximum amplitude.

This adaptation makes it possible to ensure decoding with a maximum degree of sensitivity by using the entire operational range of the converter.

In addition, in the decoding phase, the operations for restoring to scale, comparing the numerical signal (Ne) with the working thresholds, counting the pulses of the second reference signal (H2) in the presence of the validated numerical signal, dividing by the standardized deviation, effecting average calculation, multiplying by the coefficient (λ), dividing by the corrected value (Vc) and extracting words—all these operations may be effected successively in real time on a continuous stream of data, having regard to the conventional nature of these operations and the fast hard wired means available to carry out such operations. Accordingly, intermediate sequencings and storages are avoided, which implies the use of a simplified device at increased speed.

The device of the invention is a device for transmitting numerical data and making it possible to implement the previously defined process. This device includes a coding unit to convert the data into an analog signal (Sa) representative of this data, means for transmitting and adapting the analog signal and a decoding unit with a view to restoring said numerical data. The coding unit includes a frequency clock (F), means for generating the numerical signal (Nv) with a frequency depending upon (F) and words of the data (M), a periodic transcoder, and an analog/digital converter; the decoding unit includes a frequency clock (F') linked to the frequency (F), a digital/analog converter sequenced by the clock so as to deliver the numerical signal (Ne), means for generating working thresholds from this signal (Ne), means for analyzing said numerical signal (Ne) between said working thresholds, and means for calculating the sequence of words.

According to a preferred embodiment, the coding unit is characterized in that it includes a combination of the following devices: a clock to generate the first electric time reference signal (H1), a storage register controlled by the loading signal (Ch) with a view to successively loading the parameters (A+M) as a function of the numerical data, a programmable divider disposed so as to receive the first time reference signal (H1) and the parameters (A+M) derived from the register with a view to delivering the temporal data signal (Td), a modulo n counter disposed to receive said temporal data signal (Td) so as to deliver the numerical signal (Nv), a linear logic operator disposed to receive the numerical signal (Nv) with a view to step-by-step validating this signal and generating the loading signal (Ch), a periodic transcoder disposed to receive the numerical signal (Nv) with a view to delivering the transcoded numerical signal (Nt) representative of the levels of the transfer function for the values of said numerical signal, and a digital/analog converter disposed to receive the transcoded numerical signal (Nt) and a calibration signal (Ref) with a view to delivering the analog signal (Sa).

In addition, the decoding unit can be characterized in that it includes a combination of the following means: a clock to generate the second electric time reference signal (H2) an analog/digital converter disposed to receive the transmitted analog signal (S"a) and the second time reference signal (H2) with a view to delivering the numerical signal (Ne) from said analog signal, logic operators disposed to receive the numerical signal (Ne) with a view to delivering the amplitude data (DA), means for storing the standardized thresholds of the periodic transfer function, means for storing the standardized deviations of said periodic transfer function, logic operators disposed to receive the standardized thresholds derived from the storage means and the amplitude data (DA) with a view to delivering the working thresholds, comparators disposed to receive the working thresholds and the numerical signal (Ne) with a view to validating said numerical signal during the durations between working thresholds, counting devices receiving the validated numerical signal (Na) and the second time reference signal (H2) with a view to delivering the numerical signal (Nd) with values representative of the durations between working thresholds, calculation means disposed to receive the numerical signal (Nd), the standardized deviations derived from the storage means, possibly the value (A) corresponding to the parametering (A+M), possibly the coefficient (λ) and the second time reference signal (H2), with a view to sequentially carrying out the calculation operations so as to deliver the sequence of the words constituting the numerical data.

Other objects, advantages and salient features of the present invention will become apparent from the following detailed description, which, taken in conjunction with the annexed drawings discloses a preferred embodiment of the present invention.

BRIEF DESCRIPTION OF THE DRAWINGS

The process and the device of the invention are illustrated by the following description with reference to the accompanying drawings which refer more particularly to the application of the transmission of an image through a commutated telephone network, the following figures forming an integral part of this description.

DETAILED DESCRIPTION OF THE INVENTION

Figure 1:
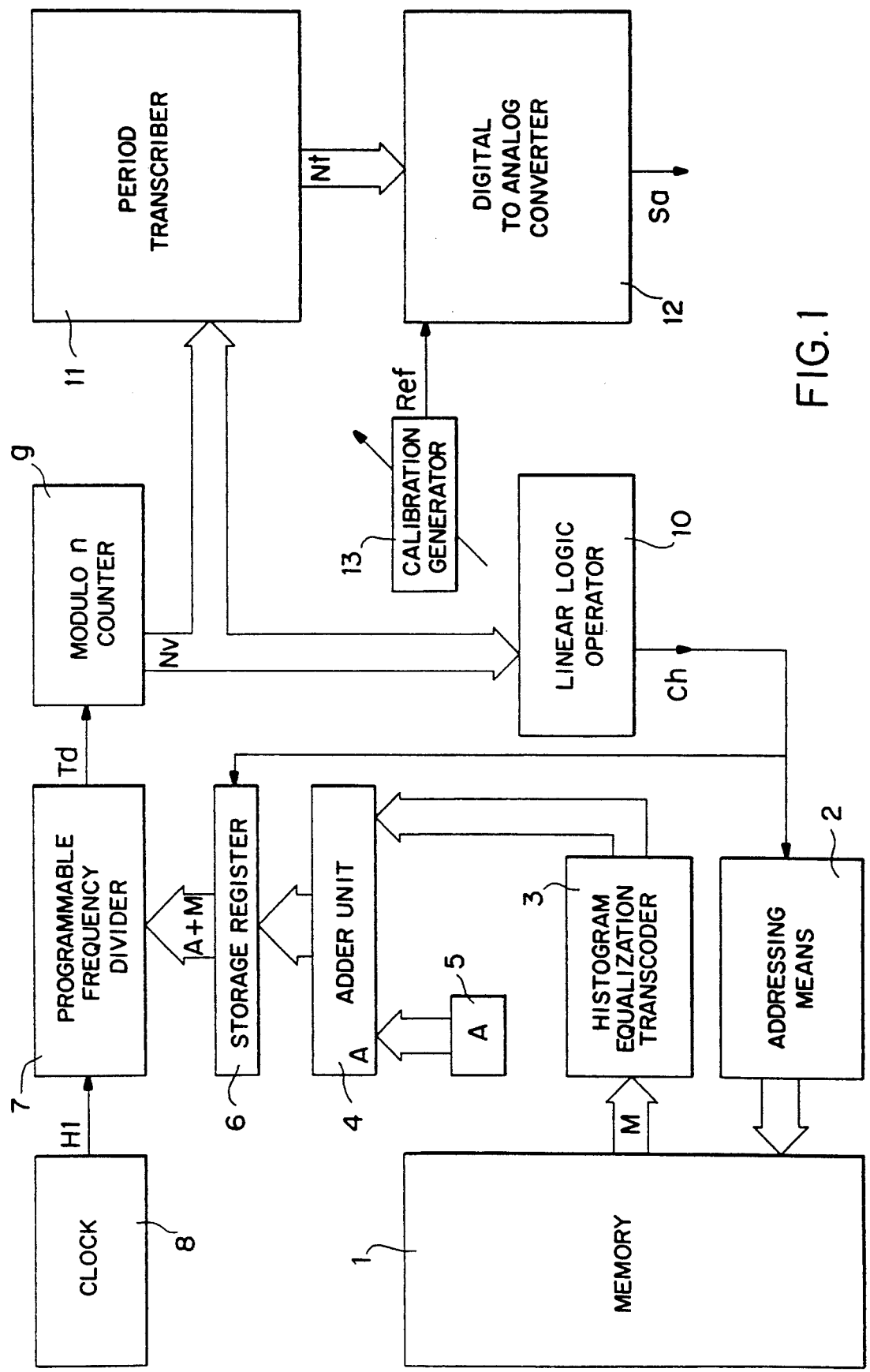
FIG. 1 is an operational block diagram of the coding unit of a transmission device according to the invention.
Figure 4:
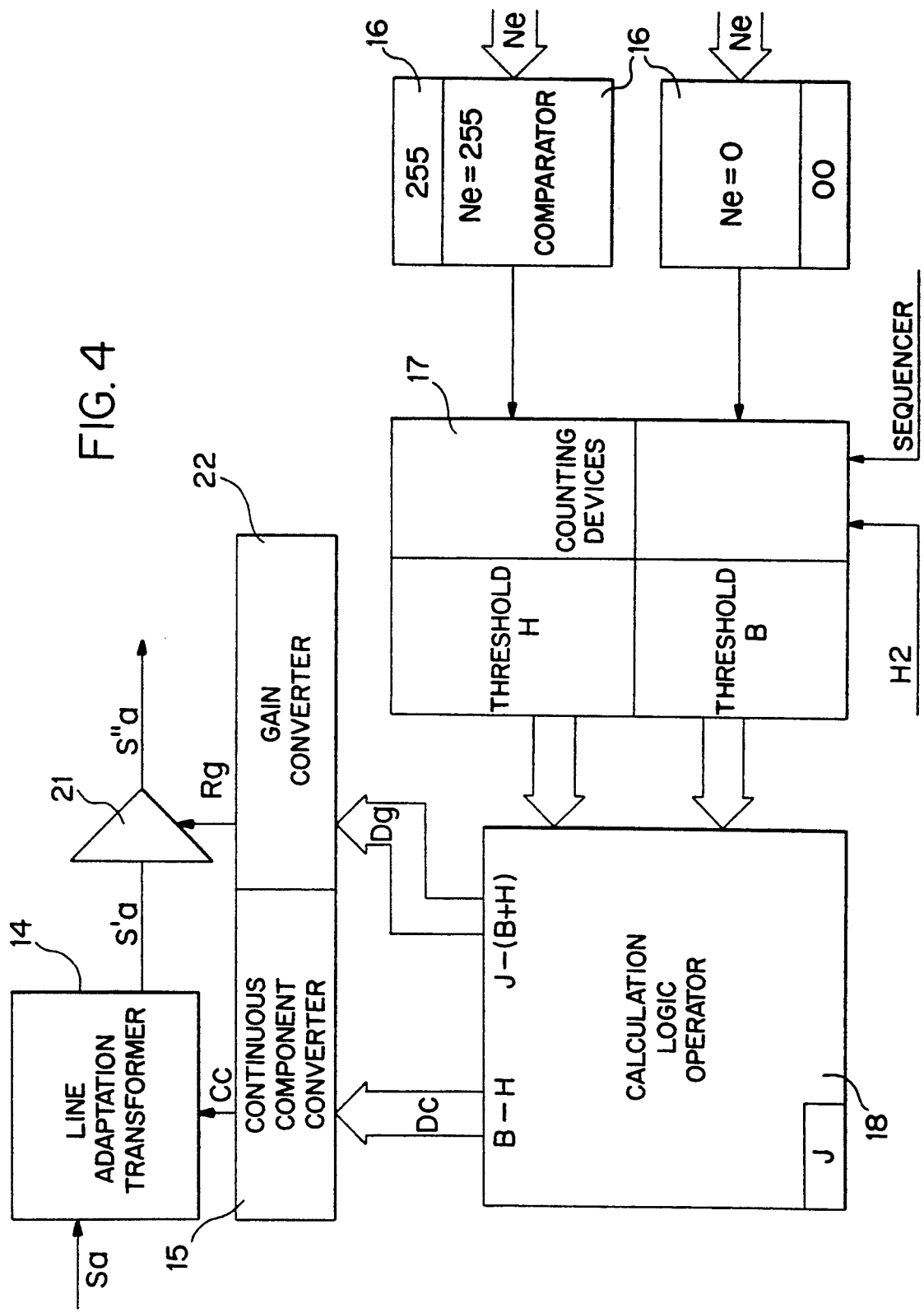
FIG. 4 is an operational block diagram of the line adaptation means with a view to generating from the signal Sa an adapted signal S"a able to be decoded.
Figure 5:
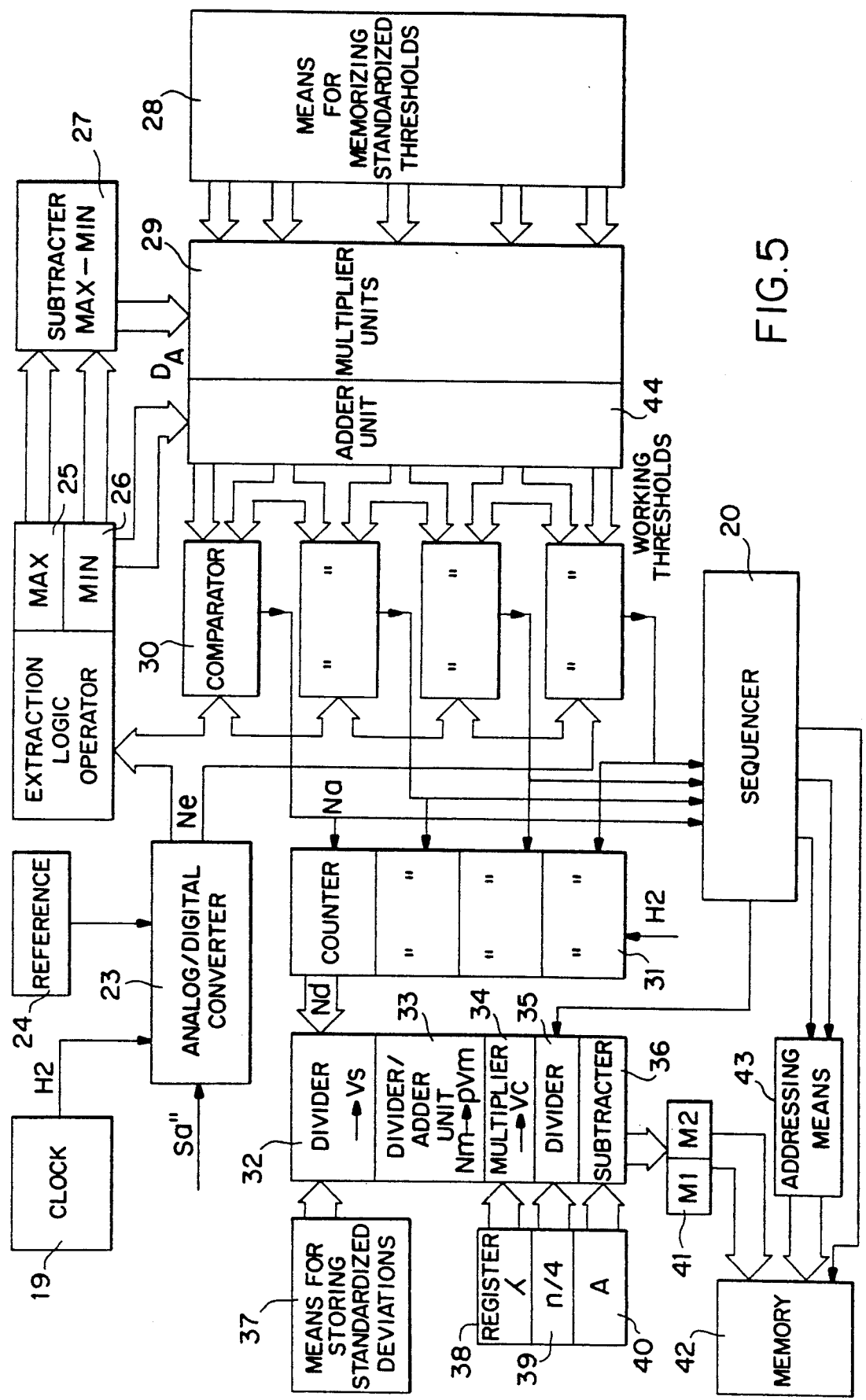
FIG. 5 is an operational block diagram of the decoding unit of the device.

The coding unit represented by way of example on FIG. 1, the adaptation means represented on FIG. 4 and the decoding unit shown on FIG. 5 may in particular be used to transmit numerical data (M) representative of a video image. This image is represented by a sequence of words (M1, M2, M3 . . . ), each word assigned to one point of the image and giving the level of grey of the latter from a number (G) with predetermined discrete levels. In the example shown subsequently, the luminance spectrum has been divided into 64 levels of different greys. Each word is then constituted by a binary number between 0 and 63. The number of points of an image may be about 60,000, each image being represented by 60,000 successive words.

The coding unit (FIG. 1) includes first a memory 1 for the prior storing of the numerical data (M), in which the various words constituting the image (M1, M2, M3 ...) are stored in a sequential order.

This memory 1 is addressed by addressing means 2 sequentially delivered by the successive addresses of the words contained in said memory. These addressing means 2 are controlled by a loading signal (Ch) which conditions the transmission of each address towards the memory and activates the sequential selection of the words.

Each word (M1, M2 ...) available at the output of the memory 1 is in the example considered processed in a histogram equalization transcoder 3 before being introduced into an adder unit 4. This conventional type of transcoder 3 is adapted so as to deliver corrected numerical data having a spectrum distributed over all the possible levels of data. For example, if for a given image the words correspond to levels between 0 and 20 (very dark image), the transcoder 3, by means of a stored table, distributes them statistically between 0 and 63 so as to increase the vision dynamics upon reception and to make easier the detection on decoding.

The adder unit 4 receives the words derived from the transcoder and a constant (A) stored in a register 5.

In the above-mentioned application, the constant A is preferably selected with a value of between 2 G and 3.5 G, for example about 2.5 G (where G is the number of grey levels); for 64 levels of grey, A is in particular taken as equal to 154. This range for the parameter A represents an optimal compromise making it possible to reduce the width of the occuped band of transmission frequencies, whilst retaining the relative deviations of sufficient transmitted signals in order to be detected satisfactorily.

The parameter (A+M) as a function of each word (A+M1, A+M2 ...) which is present at the output of the adder unit 4 is loaded sequentially into a storage register 6 via the order of the loading signal (Ch).

This storage register 6 is connected to one input of a programmable divider 7 which receives the parameter (A+M) and, on its other input, a signal (H1), namely the first time reference signal, derived from a clock 8 with a high frequency (F). In the example, this frequency may be about 60 MHz.

The divider 7 continuously divides the reference signal (H1) by the parameter (A+M1, A+M2 ...) contained in each sequence in the register 6 with a view to delivering a temporal data signal (Td) having a sequentially variable frequency ($F/_{A+M1}$, $F/_{A+M2}$) as a function of the sequence of words (M1, M2 ...).

This temporal data signal (Td) is delivered to the input of a binary counting device 9, modulo n, which gives at its output a binary numerical signal (Nv) constituted by a succession of counting values. This repetitive counting with a period $n=2^b$ is preferably carried out in such a way that $b \geq 6$ so that the output synthesized analog signal possesses good definition. (The binary signal (Nv) is made up of b bits with increasing weight). In the example in question, b=7 represents a good compromise so as to obtain a good definition of the analog signal, whilst providing it with a clock signal (H1) with a frequency compatible with technological requirements (in fact, for a desired range of frequencies for the analog signal (Sa), it is necessary to select a clock frequency (H1) as large as the counting modulo n).

The binary numerical signal (Nv) is initially delivered to a linear logic operator 10 with a view to generating said loading signal (Ch); this operator 10 step-by-step validates the signal (Nv) according to p incrementation steps on each modulo n counting. The number p of steps needs to be less than (or equal to) the value n of the counting modulo. These steps may have different durations d1, d2 ..., di ..., dp.

In the example in question, the number of steps p is selected as equal to 4 steps of equal duration, the start of the first step coinciding with the 0 of the modulo $n=2^7$ counting.

This linear logic operator 10 delivers the loading signal (Ch) which is constituted by a loading pulse at the end of each incrementation step. As already indicated, this signal (Ch) is used to firstly control the addressing means 2 and secondly the loading of the register 6 so that the words (M1, M2 ...) are available at the programmable divider 7 at the rate of one word per step.

Secondly, the bianary numerical signal (Nv) is delivered to a periodic transcoder 11 suitable for carrying out a sinusoidal transfer function on the signal (Nv) with the frequency $$\frac{F}{n. (A + M)}$$

This transcoder 11 may be simply constituted by a memory which contains the data representative of the values, modulo n, of the sinusoidal transfer function with predetermined addresses. This memory is thus addressed sequentially by the signal (Nv) derived from the counter 9 and delivers at its output a transcoded numerical signal (Nt) (in the binary example).

In the example described where p=4, each quarter period of the transfer function corresponds to one incrementation step.

The counting values (varying from 0 to n) of the binary numerical signal (Nv) (each representing one word) are thus transformed by the periodic transcoder 11 into sinusoidal equidistant levels distributed over one period, these levels constituting the transcoded numerical signal (Nt) (4n levels per period).

This transcoded numerical signal (Nt) is then transformed into an analog signal in an digital/analog converter 12. So as to adapt the amplitude of the signal to transmission norms a calibrating signal (Ref) is generated in a calibration generator 13 able to be adjusted via external control so as to serve as an amplitude reference at the converter 12.

Accordingly, a variable frequency periodic analog signal (Sa) is generated, each quarter period representing one word (M1, M2, M3 ...). This frequency signal $$\frac{F}{n. (A + M)}$$

is transmitted onto a telephone line. Each period of this signal bears 4 words so that the transmission flow is 4 times higher than in conventional processes. Additionally, when M varies (M1, M2 ...), the frequency $F/_{n.(A+M)}$ of the signal (Sa) varies in a much narrower range than in the case of these conventional processes (for identical variations of the data M).

Figure 2:
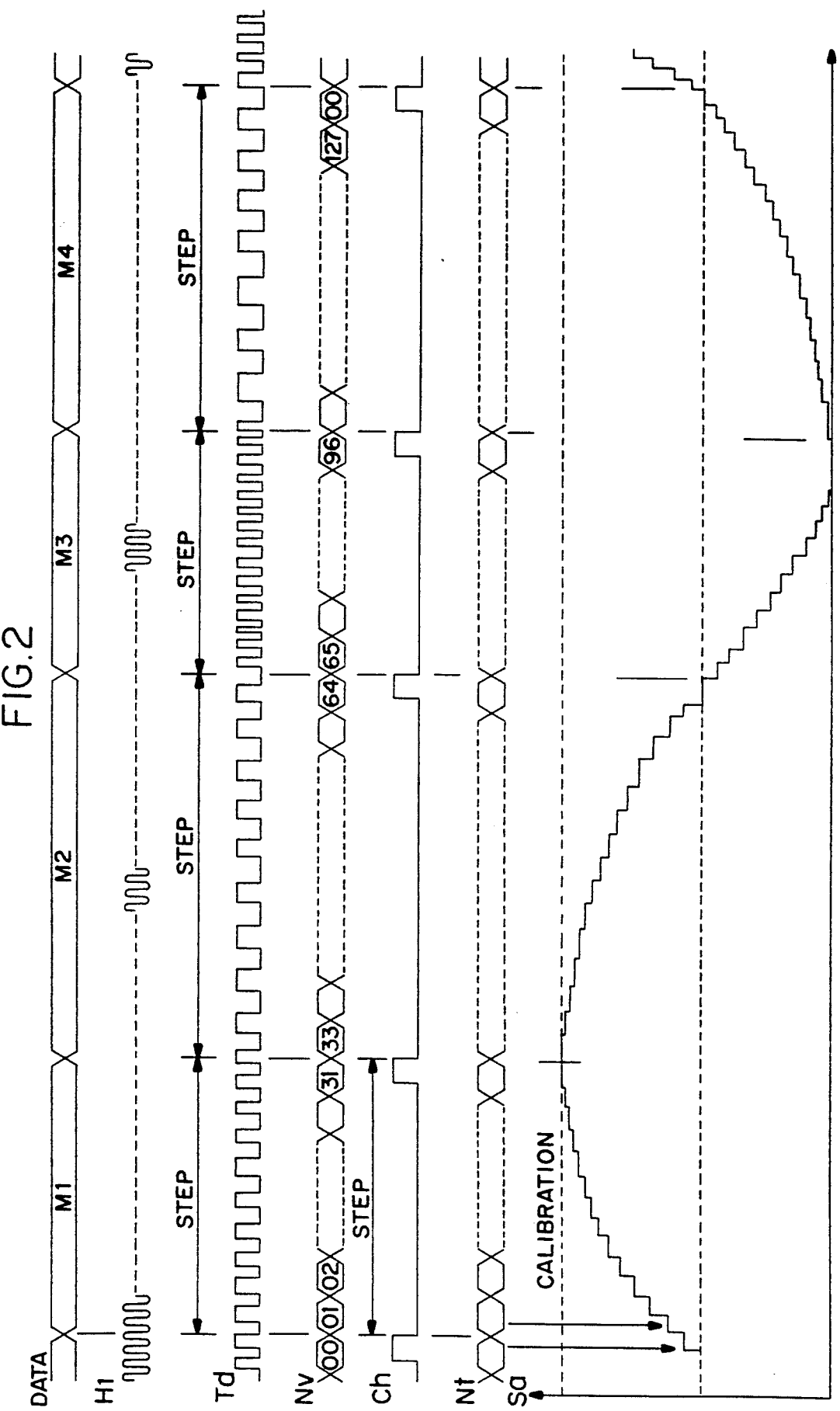
FIGS. 2 and 3 are timing diagrams illustrating the main signals derived from the various devices of the coding unit with a view to generating the analog signal Sa.

So as to illustrate the generation of the analog signal (Sa), the timing diagram of FIG. 2 successively symbolizes:

the numerical data (M) made up of the sequence of binary words (M1, M2, M3 . . . ), the time reference signal (H1) at a high frequency, the temporal data signal (Td) made up of sequences of variable durations of 32 pulses ($n/p=2^7/4$), each sequence corresponding to each incrementation step, the binary numerical signal (Nv) obtained via incrementation on each pulse of (Td) up to the value $n-1$ ($2^7-1$ in the example), the loading signal (Ch) obtained by validating counting for the values 0, 32, 64 and 96 so as to supply during one counting cycle 4 loading pulses defining the 4 incrementation steps, the transcoded numerical signal (Nt) numerically giving for each counting value of the signal (Nv) the corresponding sinusoidal level (32 levels for each step), and finally, the periodic analog signal (Sa) translating into discrete analog levels the transcoded numerical signal (Nt).

Figure 3:
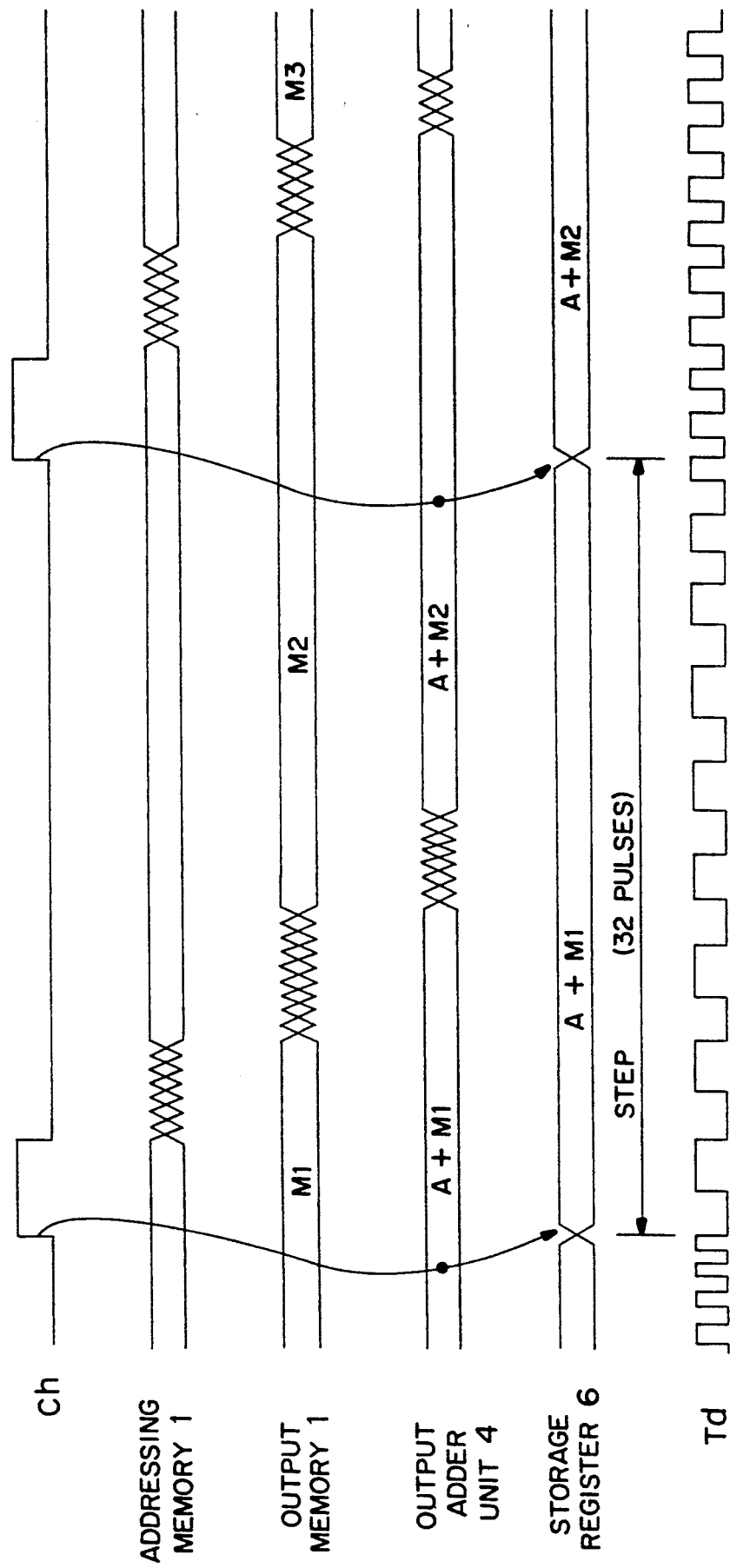

So as to illustrate the sequence taking into account of each word with a view to generating the signal (Td), the timing diagram of FIG. 3 successively symbolizes:

the loading signal (Ch), the addressing signal derived from the addressing means 2, which bears a new address after each pulse of the loading signal, the sequence of the words delivered to the adder unit 4, the sequence of the parameters (A+M) at the output of the adder unit 4, the sequence of the parameters (A+M) loaded and stored in the register 6, and the temporal data signal (Td) generated from the contents of the register 6.

Furthermore, the adaptation means, represented by way of example in FIG. 4 includes a line adaptation transformer 14 which receives the transmitted analog signal (Sa) and a continuous component (Cc) delivered by an analog/digital converter 15. This converter is controlled by calculation means composed in the example of one double comparator 16, two counters 17 provided with result storage registers, and calculation logic operators 18.

The double comparator 16 receives a numerical signal (Ne) which is worked out, as shall be seen subsequently, in the decoding unit. It compares this numerical signal with two reference values (minimum and maximum values permitted for the signal, for example 0 and 255 in the case of a $2^8$ level amplitude conversion as shall be seen subsequently).

Each counting device 17, which receives a clock signal known as a second time reference signal H2 provided by a clock 19 of the decoding unit, counts at the clock frequency the number of minimum (0) or maximum (255) values in each period furnished by a sequencer 20 forming part of the decoding unit. The weight of the minimum B or maximum H values is stored in the register of the counting device 17 so as to be sequentially delivered to the logic calculation operators 18.

These operators calculate a numerical element of data Dc with a continuous component from the weights of the minimum B or maximum H values (by substracting H from B) so as to bring back these weights to 0 in a closed loop.

This numerical component is delivered to the converter 15 which converts it into a continuous component (Cc) added to the signal derived from the secondary of the transformer 14 (which receives the analog signal (Sa) on its primary). Thus, a shifted analog signal (S'a) is obtained, this signal still retaining the same sign.

This signal (S'a) is delivered to a variable gain amplifier 21 which receives a gain adjustment signal (Rg) delivered by an analog/digital converter 22. This converter 22 is controlled by the calculation means 16, 17, 18 mentioned earlier. The logic calculation operators 18 of these means are adapted to calculate a numerical element of data with gain Dg by substracting from a predetermined constant J the sum of the weights of the minimum and maximum values: $J-(B+H)$. The constant J is selected according to the maximum amplitude on which conversion of the analog signal (S"a) is to be next carried out.

The numerical gain adjustment signal derived from the operators 18 is delivered to the converter 22 which converts it into an analog gain adjustment signal (Rg).

By means of the closed loop described above, which ensures an adjustment of the continuous component (Cc) and an adjustment of the gain (Rg) of the amplifier 21, the latter delivers an amplified analog signal (S"a), still with the same signa, with a predetermined amplitude.

This amplified analog signal (S"a) is delivered to the decoding unit shown on FIG. 5 and described hereafter.

This decoding unit includes a digital/analog converter 23 which receives the amplified analog signal (S"a), the second time reference signal (H2) derived from the aforesaid clock 19 and a reference signal generated by a continuous calibrated source 24. This reference signal is adjusted in such a way that the converter 23 has a conversion range equal to the aforesaid maximum amplitude (function of the constant J).

The converter 23 delivers the aforesaid numerical signal (Ne); the purpose of the various means described hereafter is to split said numerical signal into p period fractions (corresponding to the coding periods) and to analyze said fractions with the aid of the inverse transfer function so as to deduce from these the numerical data M.

The numerical signal (Ne) is initially distributed to the logic operators including a maximum extraction comparator 25, a minimum extraction comparator 26 and a substracter 27 disposed so as to work out the difference of the signals derived from the comparators 25 and 26; this difference signal (MAX-MIN) and the minimum signal (MIN), which are used as shall be seen subsequently, are denoted by "amplitude data" (DA).

The decoding unit further includes storage means 28 containing for each of the aforesaid p incrementation steps at least two thresholds of the sinusoidal transfer function for a standardized amplitude of the latter (standardized thresholds); other storage means 37 contain the temporal deviations between said standardized thresholds assigned to the period of the transfer function (so-called standardized deviations).

Figure 6:
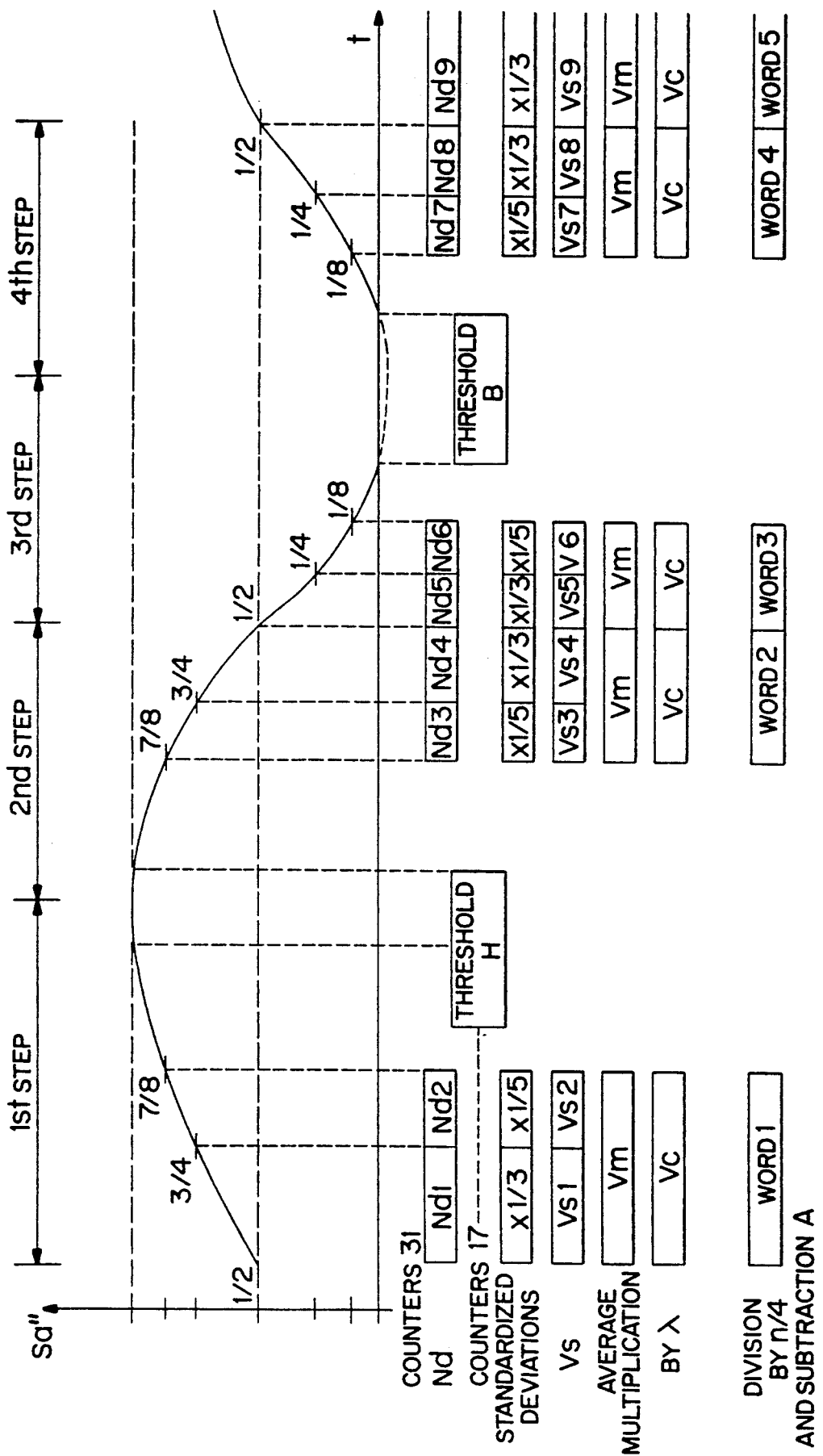
FIG. 6 is a timing diagram illustrating the main steps of decoding.

In the aforesaid example of a sinusoidal transfer function whose period is divided into four equal incrementation steps, it is advantageous to select three thresholds standardized by steps (thus defining between them two standardized deviations), as shown on FIG. 6:

for the 1st step: standardized thresholds of ½, ¾ and ⅞ with the corresponding standardized deviations ⅓ and 1/5, for the 2nd step: standardized thresholds of ⅛, ¾ and ½ with the standardized deviations 1/5 and ⅓, for the 3rd step: standardized thresholds of ½, ¼ and ⅛ with the standardized deviations ⅓ and 1/5, and for the 4th step: standardized thresholds of ⅞, ¼ and ½ with the standardized deviations 1/5 and ⅓.

It is to be noted that the particular value of these standardized deviations, then suitable for the calculations, are derived from the characteristics of the sinusoidal function (the deviation 1/5 being reached to within 3/1000).

The values of the standardized thresholds contained in the storage means 28 are delivered to a multiplier 29 which also receives the MAX-MIN amplitude data item and carries out multiplication between this data item and each standardized threshold; the result is delivered to an adder unit 44 which receives the MIN amplitude data item with a view to subtracting it from said result and to delivering working thresholds. This multiplication and addition then carry out a homothetic transformation and translation concerning the standardized thresholds so as to have the minimum and maximum of the sinusoidal transfer function respectively coincide with the minimum and maximum delimiters of the numerical signal (Ne).

It is to be noted that the "storage means 28" and the "storage means 37" are understood to also be memories able to store the values of the standardized thresholds and the standardized deviations, as well as wired circuits able to restore them, these circuits being preferably associated with those of the multiplier 29 or those of the divider 32 described subsequently so as to directly multiply them by the standardized thresholds ½, ¾ and ⅞ or divide them by the standardized deviations ⅓ and 1/5. (In practice, these operations correspond to extremely simple binary wired calculations combining the shift registers and the adder unit).

The working thresholds derived from the adder unit 44 are delivered to several comparators 30 which receive the numerical signal (Ne) and validate it between said working thresholds so as to deliver a validated numerical signal (Na).

For example, in the aforesaid case where there are five standardized thresholds (⅛, ¼, ½, ¾ and ⅞), four double comparators shall be provided to compare the numerical signal (Ne) with the pairs of neighbouring thresholds (⅛, ¼), (¼, ½), (½, ¾), (¾, ⅞).

These comparators deliver the validated numerical signal (Na) when the numerical value of the signal (Ne) is within one of the four ranges mentioned above.

The validated numerical signal (Na) is delivered to counting devices 31 which receive the second time reference signal (H2) and count the number of reference pulses of the latter when the validated signal (Na) is present. These counting devices deliver a numerical signal (Nd) with several counting values representing those durations during which the validated numerical signal (Na) was present.

This signal (Nd) is delivered to calculation means including in series a divider 32, an adder/divider 33, a multiplier 34, a divider 35 and a subtractor 36.

The divider 32 receives the numerical signal (Nd) and the standardized deviations (⅓, 1/5) and divides the counting values of the signal (Nd) by these standardized deviations. These deviations are contained in the storage means 37 (broadly speaking, that is the storage memory of the cabled circuit associated with the divider to directly carry out the operation).

The divider 32 generates a sequence of values (VS) representing the counting values of (Nd), each relating to the period of the periodic transfer function.

The adder/divider 33 works out, for each step, the average of the values (VS) corresponding to the step in question (average of the values two-by-two in the aforesaid example) with a view to generating a numerical signal (Nm) with p average values (Vm) (4 in the aforesaid example).

The frequency (F') of the clock 19 shall generally be less than the frequency (F) of the coding clock 8 owing to technological requirements; a frequency of about 30 MHz could be selected in practice for (F') with a coefficient $$\lambda = \frac{F}{F'} = 2$$

The multiplier 34 multiplies each average value (Vm) derived from the divider/adder unit 33 by this coefficient λ stored in an auxiliary register 38 so as to deliver the corrected values (Vc).

The divider 35 receives these corrected values and a parameter depending upon the counting modulo-n- (this parameter equal to n/p is stored in an auxiliary register 39). The divider 35 divides said corrected values (Ve) by this parameter with a view to obtaining a sequence of results (A+M1, A+M2 ... ). In the aforesaid example where the period is divided into 4 incrementation steps, the parameter of the division is n/4.

The subtracter 36 receives the sequence of results derived from the divider 35 and the constant A stored in an auxiliary register 40. It deducts this constant and delivers a result constituted by the sequence of the words (M1, M2 ... ).

An output register 41 provisionally stores the words and delivers them to an output memory 42 which is associated with addressing means 43 controlled by the sequencer 20 so as to write each word at a determined address. The sequencing is carried out at the frequency of the validated signal (Na).

The timing diagram of FIG. 6 illustrates the main step of the process which is implemented in the above-described decoding unit and symbolizes the functioning of the main signals or drawn up data, namely:

the amplified analog signal (S"a) (the working thresholds, after scaling, are borne on this signal), the numerical signal (Nd) derived from the counting devices 31, the weights of the minimum B and maximum H values derived from the counting devices 17, the standardized deviations stored (or cabled) in the storage means 38, the values (VS) derived from the divider 32, the average values (Vm) derived from the divider-/adder unit 33, the corrected values derived from the multiplier 34, and the words derived from the subtractor 36 after a passage in the divider 35.

The coding unit, the adaptation means and the decoding unit include conventional components which may be integrated in a single "VLSI" type circuit.

While a particular embodiment has been chosen to illustrate the invention, it will be understood by those skilled in the art that various changes and modifications can be made therein without departing from the scope of the invention as defined in the appended claims.

I claim:

1. A process for transmitting numerical data (M) in the form of a sequence of words (M1, M2, M3 ... ) for a high transmission flow for a determined band of transmission frequencies, comprising:

a coding phase in which the numerical data is converted into a periodic analog signal, in the coding phase, creating the analog signal from numerical data by generating from said numerical data and a first reference frequency (F) a first numerical signal (Nv) having a frequency dependent upon said numerical data in a time base linked to the first reference frequency (F) so that each period of said first numerical signal has p period fractions (p>1), each period fraction depending upon a word (M1, M2 ...) of the data, by performing on said first numerical signal (Nv) a periodic transfer function to generate a transcoded numerical signal (Nt) representative of the first numerical signal (Nv) and having a periodic distribution linked to said transfer function, and by performing a digital to analog conversion of said transcoded signal (Nt);

a transmission stage in which the analog signal is transmitted; and a decoding phase in which said analog signal is converted into a second numerical signal (Ne) representative of the data, in the decoding phase, converting the transmitted analog signal into the second numerical signal (Ne) by sampling at a second reference frequency (F') linked to the first reference frequency (F), by drawing up, from the second numerical signal (Ne) and the transfer function, working thresholds delimiting in said second numerical signal p period fractions corresponding to the period fractions of the coding phase, by analyzing the second numerical signal (Ne) between said working thresholds in a time base corresponding to the second reference frequency (F') to generate a third numerical signal (Nd) representative of durations between working thresholds, and by calculating from the third numerical signal (Nd) the sequence of words (M1, M2 ... ) of the data.

2. A process according to claim 1 wherein the periodic transfer function has a predetermined sinusoidal form.

3. A process for transmitting numerical data (M) in the form of a sequence of words (M1, M2, M3 ... ) for a high transmission flow for a determined band of transmission frequencies, comprising: a coding phase of generating a first electric time reference signal (H1) including first high frequency (F) reference pulses, successively loading a parameter (A+M) depending upon each word (M1, M2 ... ) into a storage register via an order of a loading signal (Ch) formed of a series of loading pulses, dividing the time reference signal (H1) by the parameter (A+M) contained in the storage register to deliver a temporal data signal (Td) having a frequency $(F/_{A+M})$ varying discretely according to the inverse function of the sequence of words $(F/_{A+M1}F/_{A+M2} \cdots )$, carrying out a modulo n counting of the temporal data signal (Td) to deliver a numerical signal (Nv) constituted by counting values, n being a whole number selected as a function of a desired transmission accuracy, carrying out a linear combination of said numerical signal (Nv) to step-by-step validate the numerical signal (Nv) with incrementation steps in number equal to p (p≦n) and with durations d1, d2 ... , di ... dp to generate the loading signal (Ch) including a loading pulse at the end of each incrementation step, performing a periodic transfer function at the frequency $$\frac{F}{n.(A+M)}$$

on the numerical signal (Nv) to deliver a transcoded numerical signal (Nt) representative of levels of the transfer function for values of the numerical signal (Nv), and converting the transcoded numerical signal (Nt) into an analog signal (Sa) with a maximum calibrated amplitude to deliver a periodic analog signal having for an envelope, the transfer function, each period having p period fractions, each period fraction depending upon a word (M1, M2 ... );

transmitting the analog signal (Sa) and receiving the analog signal (Sa) with a suitable adaptation forming an adapted analog signal (S"a); and in a decoding phase of generating a second electric time reference signal (H2) with a second frequency (F') linked to the first frequency (F) of the first reference signal (H1) in a constant ratio λ=F/F', converting the adapted analog signal (S"a) with a sampling frequency F' into a numerical signal (Ne), an image of the transcoded numerical signal (Nt), extracting and storing minimum and maximum (MIN, MAX) delimiters of the numerical signal (Ne) to generate amplitude data (DA) characterizing the numerical signal (Ne), storing, for each of the p incrementation steps, firstly, at least two standardized thresholds of the periodic transfer function for a standardized amplitude of the periodic transfer function, and, secondly, temporal standardized deviations between said thresholds relating to the period of the transfer function, restoring to scale said standardized thresholds according to amplitude data (DA) to obtain shifted threshold values according to said amplitude data and to working thresholds, comparing the numerical signal (Ne) with the working thresholds to generate a numerical signal (Na) validated during durations between working thresholds, counting the number of reference pulses of a second reference signal (H2) in the presence of a validated numerical signal (Na) to generate a numerical signal (Nd) with several counting values representative of the durations during which the validated numerical signal (Na) is present, dividing each value of the numerical signal (Nd) by the corresponding deviation to generate a series of values (Vs), each value referring to the period of the periodic transfer function, for each incrementation step calculating, if appropriate, the average (Vm) of said values (Vs) to generate a numerical signal (Nm) with p average values (Vm) depending upon the sequence of words (M1, M2 . . . )

where the second frequency (F') differs from the first frequency (F), of multiplying each of said p average values by a coefficient λ to obtain a series of p corrected values (Vc), and dividing each corrected value (Vc) by a parameter depending upon the modulo n to obtain a series of results (A+M1, A+M2 . . . ) and to deduce the sequence of words (M1, M2 . . . ) constituting the numerical data.

4. A process according to claim 3, wherein, in the coding phase, generating the loading signal (Ch) by forming a linear combination of the numerical signal (Nv) by validating this signal on four incrementation steps of the same duration, and effecting a sinusoidal transfer function on said numerical signal (Nv) for one period so that each quarter period of said sinusoidal transfer function corresponds to one incrementation step, the counting values of said numerical signal (Nv) being transformed into sinusoidal levels distributed over one period to constitute the transcoded numerical signal (Nt).

5. A process according to claim 4, wherein, in the coding phase, a binary counting, modulo $n=2^b$ is made of the temporal data signal (Td), where $b \geq 6$, to deliver a binary numerical signal (Nv) with b bits of increasing weights.

6. A process according to claim 5, wherein, in the coding phase, storing the sinusoidal transfer function in the form of a table, said table including data representative of the modulo n values of said sinusoidal transfer function at predetermined addresses, and successively addressing said table with the aid of the binary counting values of the numerical signal (Nv) and by simultaneously extracting corresponding data contained in the table.

7. A process according to claim 6, wherein, in the coding phase, storing the sequence of words (M1, M2 . . . ) to be transmitted in a memory, addressing said memory to successively select each word activated by the loading signal (Ch), and loading a parameter (A+M) depending upon the word addressed into a storage register by the order of the loading signal (Ch).

8. A process according to claim 7, wherein, the coding phase, prior to each division of the reference signal (H1), the parameter (A+M) is calculated by adding the addressed word (M1, M2 . . . ) to a constant (A), and this parameter is loaded into the storage register by an order of the loading signal (Ch) to carry out division of the reference signal (H1).

9. A process according to claim 8 wherein, in the coding phase, an adjustable calibration signal (Ref) is firstly generated by an external command, and the transcoded numerical signal (Nt) is converted into an analogy signal (Sa) by using the adjustable calibration signal as an amplitude reference.

10. A process according to claim 9, wherein the analog signal (Sa) is adapted upon its receiving by adding thereto a continuous component so that a resultant shifted analog signal (S'a) retains the same sign.

11. A process according to claim 10, wherein the shifted analog signal (S'a) is amplified with a variable gain adjusted sequentially to deliver an amplified analog signal (S"a) extending on a predetermined maximum amplitude, and in the decoding phase, conversion is carried out on the amplified analog signal (S"a) by an analog to digital converter having a range of conversion equal to said maximum amplitude.

12. A process according to claim 6, wherein, in the decoding phase, for the sinusoidal transfer function, storing standardized thresholds of $\frac{1}{8}$, $\frac{3}{8}$, and $\frac{7}{8}$ with the relative standardize deviations $\frac{1}{8}$ and 1/5 for the first incrementation step; storing thresholds of $\frac{1}{8}$, $\frac{3}{8}$ and $\frac{1}{2}$ with the relative standardize deviations 1/5 and $\frac{1}{8}$ for the second incrementation step; storing thresholds of $\frac{1}{2}$, $\frac{3}{4}$ and $\frac{7}{8}$ with the relative standardize deviations $\frac{1}{8}$ and 1/5 for the third incrementation step; and storing thresholds of $\frac{1}{8}$, $\frac{1}{4}$ and $\frac{1}{2}$ with the relative standardized deviations 1/5 and $\frac{1}{8}$ for the fourth incrementation step.

13. A process according to claim 11, wherein, in the decoding phase, a restoration to scale is effected of the standardized thresholds by carrying out translation and homothetic operations on the stored standardized thresholds to have a minimum and a maximum of the sinusoidal transfer function coincide, respectively, with minimum and maximum delimiters of the numerical signal (Ne).

14. A process according to claim 13 wherein, in the decoding phase, the restoration to scale is effected by calculating the difference of the minimum (MIN) and maximum (MAX) delimiters of the numerical signal (Ne), by multiplying each standardized threshold by this difference and by adding to the result said minimum (MIN) delimiter to obtain the corresponding working threshold.

15. A process according to claim 12, wherein, in the decoding phase, the counting values of the numerical signal (Nd) are divided by standardized deviations of $\frac{1}{8}$ and 1/5, and the average two-by-two of the values (Vs) obtained is calculated to generate the numerical signal (Nm) with four average values (Vm) over one period.

16. A process according to claim 8, wherein, in the decoding phase, the sequence of words is deduced by subtracting the constant (A) from the sequence of calculated parameters.

17. A process according to claim 14, wherein, in the decoding phase, the restoration to scale, the counting operation, the dividing of the numerical signal (Nd) by the standardized deviation, the averaging of the value (Vs), the multiplying by the coefficient λ, the dividing of the corrected value (Vc) and the subtraction of the constant (A) from calculated parameters are successively effected data-flow in real time to deliver a numerical signal representative of the sequence of words (M1, M2 . . . ), said numerical signal then being stored.

18. A process according to claim 17, wherein numerical data (M) is representative of an image with each word (M1, M2 . . . ) representing a level of grey of one point from a number G of discrete levels of greys; and each parameter (A+M) is calculated by adding the word corresponding to a constant (A) between 2 G and 3.5 G.

19. A device for transmitting numerical data (M) in the form of a sequence of words (M1, M2, M3 . . . ) for high transmission flow for a determined band of transmission frequencies, comprising:
- a coding means for converting the numerical data into an analog signal (Sa) representative of the numerical data, the coding means including a clock with a frequency (F), means for generating a numerical signal (Nv) with a frequency depending upon clock frequency (F) and words of the numerical data (M), a periodic transcoder, and a digital to analog converter;
- means for transmitting and adapting the analog signal; and
- a decoding means for restoring said numerical data, the decoding means including a clock with a frequency (F') linked to the frequency (F), an analog to digital converter sequenced by the clock to deliver a numerical signal (Ne), means for generating working thresholds from the numerical signal (Ne), means for analyzing said numerical signal (Ne) between said working thresholds, and means for calculating the sequence of words.

20. Device for transmitting numerical data (M) in the form of a sequence of words (M1, M2, M3 ...) for high transmission flow for a determined band of transmission frequencies, comprising:
- a coding means for converting the numerical data into an analog signal (Sa) representative of the numerical data, the coding means including a clock for generating a first electric time reference signal (H1), a storage register controlled by a loading signal (Ch) to successively load parameters (A+M) depending upon the numerical data, a programmable divider disposed to receive the first time reference signal (H1) and the parameters (A+M) derived from the storage register to deliver a temporal data signal (Td), a modulo n counting device disposed to receive said temporal data signal (Td) to deliver a numerical signal (Nv), a linear logic operator disposed to receive the numerical signal (Nv) to step-by-step validate the numerical signal (Nv) and to generate the loading signal (Ch), a periodic transcoder disposed to receive the numerical signal (Nv) to deliver a transcoded numerical signal (Nt) representative of levels of a transfer function for values of the numerical signal (Nv), and a digital to analog converter disposed to receive the transcoded numerical signal (Nt) and a calibration signal (Ref) to deliver the analog signal (Sa),
- means for transmitting and adapting the analog signal; and
- a decoding means for registering the analog signal (Sa) to the numerical data, the decoding means including a clock for a second electric time reference signal (H2), an analog to digital converter disposed to receive the transmitted analog signal and the second time reference signal (H2) to deliver a numerical signal (Ne) from the analog signal, logic operators disposed to receive the numerical signal (Ne) to deliver amplitude data (DA), threshold storage means for storing standardize thresholds of a periodic transfer function, deviation storage means for storing corresponding standardize deviations of the periodic transfer function, logic operators disposed to receive the standardized thresholds derived from the threshold storage means and the amplitude data (DA) to deliver working thresholds, comparators disposed to receive the working thresholds and the numerical signal (Ne) to validate the numerical signal (Ne) during the durations between working thresholds, counting devices receiving a validated numerical signal (Na) and the second time reference signal (H2) to deliver a numerical signal (Nd) with values representative of the durations between working thresholds, calculation means disposed to receive the numerical signal (Nd), the standardized deviations derived from the deviation storage means, a value (A) corresponding to the parameters (A+M), a coefficient (λ), and the second time reference signal (H2) to sequentially carry out calculation operations to deliver the sequence of words constituting the numerical data.

21. A device according to claim 20, wherein the periodic transcoder comprises a memory containing data representative of modulo n of the periodic transfer function; and the modulo n counting device is connected to the periodic transcoder memory for sequential addressing.

22. A device according to claim 21, wherein a register for storing the constant (A) and an adder unit is disposed to receive the numerical data (M) and the constant (A) and to deliver the parameters (A+M) to the storage register.

23. A device according to claim 22, wherein a numerical data memory for prior storage of the numerical data (M) and means for, addressing said numerical data memory are controlled by the loading signal (Ch) to deliver the data on each loading step.

24. A device according to claim 23, wherein a histogram equalization transcoder is disposed to receive the numerical data and to deliver corrected numerical data having a spectrum distributed over all possible data (M) levels.

25. A device according to claim 24, wherein a line adaptation transformer receives the analog signal (Sa) and a continuous component (Cc) and delivers a shifted analog signal (S'a) with the same sign; and a variable gain amplifier receives said shifted analog signal (S'a) and a gain adjustment signal (Rg) to deliver an amplified analog signal (S''a) extending over a predetermined maximum amplitude.

26. A device according to claim 25, wherein
- the line adaptation transformer is associated with a converter controlled by calculation means receiving the numerical signal (Ne) and formula by closed-looped extraction a continuous component data item (Dc), and
- the variable gain amplifier is associated with an analog to digital converter controlled by calculation means receiving the numerical signal (Ne) and forming by a closed-loop extraction a numerical gain data (Dg).

27. A device according to claim 26, wherein the logic operations adapted to deliver the amplitude data (DA) include a maximum extraction comparator, a minimum extraction comparator and a substracter disposed to work out the difference of the signals derived from the comparators.

28. A device according to claim 27, wherein logic operators adapted to deliver the working thresholds include a multiplier connected to the subtracter and to means for storing the standardized thresholds, and an adder unit connected to said multiplier and to the minimum extraction comparator.

29. A device according to claim 22, wherein the calculation means include in series a divider receiving the numerical signal (Nd) and the standardized deviations, an adder unit/divider disposed to calculate on each step the average (Vm) of the values (Va) derived from the divider, a multiplier by the coefficient (λ), a divider for dividing the corrected values (Vc) derived from the multiplier by the parameter depending upon the counting modulo n, and a subtracter receiving the constant (A) for subtraction from results (A+M) derived from the divider.

30. A device according to claim 29, wherein an output memory for storing calculated data and means for addressing said output memory and controlled by a sequencer receives the validated numerical signal (Na) derived from the comparators providing a sequencing at the frequency of the numerical signal (Na).

* * * * *